(12) United States Patent
Long et al.

(10) Patent No.: US 7,923,399 B2
(45) Date of Patent: Apr. 12, 2011

(54) ZEOLITE-CONTAINING HYDROCARBON-CONVERTING CATALYST, THE PREPARATION PROCESS THEREOF, AND A PROCESS FOR CONVERTING HYDROCARBON OILS WITH THE CATALYST

(75) Inventors: Jun Long, Beijing (CN); Zhijian Da, Beijing (CN); Huiping Tian, Beijing (CN); Zhenyu Chen, Beijing (CN); Weilin Zhang, Beijing (CN); Xingtian Shu, Beijing (CN); Jiushun Zhang, Beijing (CN); Yuxia Zhu, Beijing (CN); Yujian Liu, Beijing (CN)

(73) Assignees: China Petroleum & Chemical Corporation, Beijing (CN); Research Institute of Petroleum Processing Sinopec, Beijing (CN)

( * ) Notice: Subject to any disclaimer, the term of this patent is extended or adjusted under 35 U.S.C. 154(b) by 846 days.

(21) Appl. No.: 11/547,209

(22) PCT Filed: Mar. 31, 2005

(86) PCT No.: PCT/CN2005/000427
§ 371 (c)(1),
(2), (4) Date: May 30, 2007

(87) PCT Pub. No.: WO2005/094992
PCT Pub. Date: Oct. 13, 2005

(65) Prior Publication Data
US 2007/0293714 A1  Dec. 20, 2007

(30) Foreign Application Priority Data

Mar. 31, 2004 (CN) .......................... 2004 1 0029861
Mar. 31, 2004 (CN) .......................... 2004 1 0029862
Jul. 14, 2004 (CN) .......................... 2004 1 0068936
Jul. 14, 2004 (CN) .......................... 2004 1 0068937

(51) Int. Cl.
B01J 29/42 (2006.01)
(52) U.S. Cl. .......................... 502/73; 502/74
(58) Field of Classification Search ............... 502/60–87
See application file for complete search history.

(56) References Cited

U.S. PATENT DOCUMENTS

| | | | |
|---|---|---|---|
| 3,541,179 A | 11/1970 | Okagami et al. | |
| 3,647,682 A | 3/1972 | Rabo et al. | |
| 3,725,495 A | 4/1973 | Wrisberg et al. | |
| 3,758,403 A | 9/1973 | Rosinski | |
| 3,839,485 A | 10/1974 | Wrisberg et al. | |
| 5,006,497 A | 4/1991 | Herbst et al. | |
| 5,236,880 A | 8/1993 | Chapman | |
| 5,318,696 A | 6/1994 | Kowalski | |
| 6,346,224 B1 * | 2/2002 | Vitale-Rojas et al. | 423/328.2 |
| 6,420,295 B1 | 7/2002 | Wu et al. | |

FOREIGN PATENT DOCUMENTS

| | | |
|---|---|---|
| CN | 1034223 | 3/1997 |
| CN | 1042201 | 2/1999 |
| CN | 1043502 | 6/1999 |
| CN | 1048428 | 1/2000 |
| CN | 1053918 | 6/2000 |
| CN | 1055301 | 8/2000 |
| CN | 1317543 | 10/2001 |
| CN | 1102634 | 3/2003 |
| CN | 1465527 | 1/2004 |
| CN | 1504540 | 6/2004 |
| CN | 1566267 | 1/2005 |
| DE | 152356 | 11/1981 |
| DE | 225135 | 7/1985 |
| RU | 2144525 | 11/1994 |
| SU | 410037 | 1/1974 |
| SU | 487927 | 10/1975 |
| SU | 523133 | 7/1976 |
| SU | 550173 | 3/1977 |
| SU | 559946 | 5/1977 |
| SU | 1214726 | 2/1986 |
| WO | 2005094992 | 10/2005 |

* cited by examiner

Primary Examiner — Glenn Caldarola
Assistant Examiner — Randy Boyer
(74) Attorney, Agent, or Firm — Carlson, Gaskey & Olds PC

(57) ABSTRACT

A catalyst for converting hydrocarbons includes, based on the weight of the catalyst, 1-60% by weight of a zeolite, 0.1-10% by weight of an assistant catalytic component, 5-98% by weight of a thermotolerant inorganic oxide, and 0-70% by weight of a clay in terms of the oxide. The zeolite is a MFI-structured zeolite-containing phosphor and transition metal(s) or a mixture of the zeolite and a macroporous zeolite, which comprises, based on the weight of the mixture, 75-100% by weight of said MFI-structured zeolite containing phosphor and transition metal(s) and 0-25% by weight of the macroporous zeolite. In terms of the mass of the oxide, the MFI-structured zeolite containing phosphor and transition metal(s) has the following anhydrous chemical formula:

$(0-0.3)Na_2O \cdot (0.3-5.5)Al_2O_3 \cdot (1.0-10)P_2O_5 \cdot (0.7-15)$
$M1_xO_y \cdot (0.01-5)M2_mO_n \cdot (0-10)RE_2O_3 \cdot (70-97)SiO_2$    I or $(0-0.3)Na_2O \cdot (0.3-5)Al_2O_3 \cdot (1.0-10)P_2O_5 \cdot (0.7-15)$
$M_pO_q \cdot (0-10)RE_2O_3 \cdot (70-98)SiO_2$    II The assistant catalytic component is one or more selected from the group consisting of the alkali earth metals, Group IVB metals, non-noble metals of Group VIII, and rare earth metals of the Periodic Table of the Elements. This catalyst has a higher ability to convert petroleum hydrocarbons and higher yields for propylene, ethylene, and light aromatics.

17 Claims, No Drawings

ZEOLITE-CONTAINING HYDROCARBON-CONVERTING CATALYST, THE PREPARATION PROCESS THEREOF, AND A PROCESS FOR CONVERTING HYDROCARBON OILS WITH THE CATALYST

CROSS-REFERENCE TO RELATED APPLICATIONS

This application is the National Stage application of PCT Application No. PCT/CN2005/000427 filed Mar. 31, 2005, which claims priority to Chinese Patent Application No. 200410029861.9 filed Mar. 31, 2004; Chinese Patent Application No. 200410029862.3 filed Mar. 31, 2004; Chinese Patent Application No. 200410068936.4 filed Jul. 14, 2004; and Chinese Patent Application No. 200410068937.9 filed Jul. 14, 2004.

FIELD OF THE INVENTION

The present invention relates to a hydrocarbon conversion catalyst containing zeolites, the preparation process thereof, and a process for converting hydrocarbon oils with the catalyst.

DESCRIPTION OF THE RELATED ART

Light olefins, such as ethylene and propylene, as well as light aromatics are important feedstocks for petrochemical industry, and the demand for them grows day by day. Known processes for producing ethylene and propylene include thermal conversion of hydrocarbons using a tubular furnace steam thermal cracking process of light hydrocarbon. Catalytic cracking or catalytic pyrolysis processes of heavy hydrocarbons can produce a certain amount of ethylene and propylene. There are also processes for producing ethylene and propylene from olefin-containing hydrocarbon feedstocks through catalytic conversion with zeolite-containing catalysts. The production of aromatics is mainly realized by the catalytic reforming of distilled gasoline.

Catalysts used to produce light olefins with petroleum hydrocarbons as feedstocks by catalytic cracking or pyrolysis are roughly divided into three classes. The first is a metal catalyst supported on an oxide, wherein the support may be $SiO_2$, $Al_2O_3$, or other oxides, and the metal is selected from elements of Groups IIB, VB, VIIB, and VIII (U.S. Pat. No. 3,541,179, U.S. Pat. No. 3,647,682, DD225135, and SU1214726). During the reaction process of cracking, the condensation and coking reaction is accelerated due to the dehydrogenation ability of the supported metal. Therefore, this type of catalyst can only be used for processing light feedstocks with a boiling range lower than 220° C.

The second class of catalyst is a composite oxide, such as a composite comprising mainly $ZrO_2$ and/or $HfO_2$ and also $Al_2O_3$, $Cr_2O_3$, MnO, and/or $Fe_2O_3$ as well as oxides of alkali or alkali earth metals (U.S. Pat. No. 3,725,495 and U.S. Pat. No. 3,839,485). Another example is potassium vanadate, potassium stannate, or potassium niobate, which yields 56% by weight of light olefins when used to crack gasoline, wherein the yield of ethylene can attain 36.5% by weight and that of propylene can attain 12.5% by weight (SU523133, SU487927, and SU410037). A further example is a $SiO_2 \cdot Al_2O_3$ catalyst containing small amounts of $Fe_2O_3$, $TiO_2$, CaO, MgO, $Na_2O$, and/or $K_2O$ used in the cracking of various hydrocarbon fractions (SU550173, SU559946). The more commonly used composite oxide is amorphous $SiO_2 \cdot Al_2O_3$ (DD152356).

The third class of catalysts are zeolites, especially the catalysts containing zeolites with the MFI structure (five-member-ring, high-silica zeolites).

U.S. Pat. No. 3,758,403 discloses a process for catalytically cracking hydrocarbon feedstocks, wherein the process comprises bringing a hydrocarbon feedstock into contact with a catalyst under cracking conditions. The catalyst contains a mixture of ZSM-5 zeolite and a zeolite with pores size greater than 0.7 nm. This process enhances the octane number of the gasoline while increasing the yield of $C_3^=$-$C_4^=$ olefins.

CN1042201C discloses a cracking catalyst for increasing the yield of $C_3$-$C_5$ olefins, wherein the catalyst consists of 10-50% Zeolite-Y with a unit cell size smaller than or equal to 2.450 nm, 2-40% ZSM-5 zeolite and zeolite-β modified with an element selected from P, RE, Ca, Mg, H, Al, etc and mixtures thereof, and 20-80% semi-synthetic support consisting of kaolin and an alumina binder. This catalyst can increase the yield of ethylene and propylene and maintain the yield of gasoline at high levels.

CN1055301C discloses a cracking catalyst for increasing the yield of iso-olefines and gasoline, which consists of 5-70% composite alumina-based binder, 5-65% clay, and 23-50% zeolite. The zeolite is a mixture of 15-82% Zeolite-Y and the balance amount of rare earth-containing, five-member-ring, high-silica zeolite and/or HZSM-5 zeolite containing 0-10% by weight of phosphor (in terms of $P_2O_5$). When the rare earth-containing, five-member ring, high-silica zeolite and HZSM-5 zeolite are present simultaneously, the content of the rare earth-containing, five-member ring, high-silica zeolite does not exceed 65%. This catalyst is mainly used to increase the yield of iso-olefins and gasoline.

CN1102634C discloses a catalyst for producing light olefins by catalytic pyrolysis, wherein the catalyst consists of 10-70% clay, 5-85% thermotolerant inorganic oxide, and 1-50% zeolite, wherein the zeolite is 0-25% Zeolite-Y and 75-100% five-member-ring structured, high-silica zeolite, containing phosphor and aluminum, magnesium or calcium. The high-silica zeolite is ZSM-5, -8, or -11 type zeolite containing 2-8% phosphor and 0.3-3% aluminum, magnesium, or calcium (in terms of oxide) and having a silica/alumina ratio of 15-60. This catalyst is mainly used for producing ethylene by catalytic pyrolysis.

CN1317543A discloses a process for producing ethylene and propylene by catalytic pyrolysis of petroleum hydrocarbons, which process comprises bringing preheated heavy petroleum hydrocarbons into contact with a catalyst containing a ZSM-5 zeolite in a reactor in the presence of high temperature steam under a reaction temperature of 650-750° C., a reaction pressure of $1.5-4\times10^5$ Pa, a reaction time of 0.2-5 s, a catalyst/oil weight ratio of 15-40:1, and a steam/feed oil weight ratio of 0.3-1:1 to carry out catalytic pyrolysis. The ZSM-5 zeolite contains 0.1-8% by weight of Ag or Cu.

U.S. Pat. No. 5,006,497 discloses a multi-zeolite catalyst, comprising: (1) at least one large pore molecular sieve; (2) a shape selective zeolite having a constraint index of 1-12, that is substantially free of hydrogenation/dehydrogenation components, and includes paraffin cracking/isomerization activity; (3) a shape selective zeolite having a constraint index of 1-12 and paraffin aromatization activity; and (4) a matrix. The large pore molecular sieve is selected from conventional macroporous zeolites, such as Zeolite-L, Zeolite-X, and Zeolite-Y. The shape-selective zeolite with a restraint index of 1-12 is selected from ZSM-5, ZSM-11, ZSM-12, ZSM-23, ZSM-35, ZSM-48, ZSM-57, and ZSM-5 containing borium, gallium, zirconium, and titanium. This catalyst can increase the octane number and yield of gasoline.

U.S. Pat. No. 5,236,880 discloses a zeolite catalyst with improved hydrocarbon conversion comprising a crystalline aluminosilicate having a $SiO_2/Al_2O_3$ ratio greater than 5 and preferably MFI or MEL zeolite. The zeolite contains a Group VIIIB metal, preferably nickel. The catalyst can be used in a process for the conversion of paraffinic feedstocks to improve paraffin cracking activity, to increase the aromatic fraction in the C5 to C12 gasoline range products, to improve the calculated octane numbers of the C5 to C12 gasoline range products, and/or to improve the yield of the C5 to C12 gasoline range products.

CN1048428C discloses a multi-zeolite catalyst for producing light olefins, which catalyst consists of 0-70% by weight of a clay, 5-90% by weight of a thermotolerant inorganic oxide, and 10-35% of a zeolite, wherein the zeolite consists of 20-75% by weight of a five-member-ring, high-silica zeolite containing phosphor and rare earth, 20-75% by weight of a high-silica Zeolite-Y, and 1-25% by weight of an rare earth-containing Zeolite-Y. This catalyst is mainly used to increase the yield of isobutene and isopentene.

CN1053918C discloses a bi-zeolite catalyst for producing light olefins, wherein the catalyst consists of 0-70% by weight of a clay, 5-90% by weight of a thermotolerant inorganic oxide, and 10-40% of a zeolite, wherein the zeolite consists of 25-75% by weight of a five-member-ring, high-silica zeolite containing phosphor and rare earth, 25-75% by weight of a high-silica Zeolite-Y, or a rare earth-containing Zeolite-Y. This catalyst is mainly used to increase the yield of propylene, isobutene and isopentene.

CN1043502C discloses a cracking catalyst having a support that is 0-70% by weigh of a clay and 5-99% by weight of a thermotolerant inorganic oxide, and the active component is a mixture of ZSM-5 and a Y-type zeolite in an amount of 1-50% by weight. In the active component, ZSM-5 comprises 75-100% by weight, and the Y-type zeolite comprises 0-25% by weight. This catalyst is suitable for producing light olefins, especially propylene and butene, and jointly producing gasoline and diesel oil.

CN1034223C discloses a cracking catalyst including 0-70% clay, 5-99% thermotolerant inorganic oxide, and 1-50% zeolite, wherein the zeolite is a mixture of 0-25% by weight of REY or a high-silica Zeolite-Y and 75-100% by weight of a five-member-ring, high-silica zeolite containing phosphor and rare earth. This catalyst is suitable for producing ethylene, propylene, and butene, mainly propylene and butane, and jointly producing gasoline and diesel oil.

SUMMARY OF THE INVENTION

The objective of the present invention is to provide a catalyst having increased ability to convert petroleum hydrocarbons with a high yield for propylene, ethylene, and light aromatics, and a preparation process of the catalyst. Another objective of the present invention is to provide a process for converting hydrocarbon oils with the catalyst.

The catalyst provided by the present invention contains a zeolite, a thermotolerant inorganic oxide, and optionally a clay. The zeolite is a MFI-structured zeolite containing phosphor and transition metal(s) or a mixture of the MFI-structured zeolite containing phosphor and transition metal(s) with a macroporous zeolite which comprises, based on the weight of the mixture, 75-100% by weight of the MFI-structured zeolite containing phosphor and transition metal(s) and 0-25% by weight of the macroporous zeolite. In terms of the mass of the oxide, the MFI-structured zeolite containing phosphor and transition metal(s) has anhydrous chemical formula selected from:

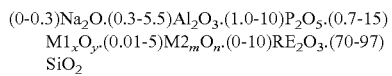

and

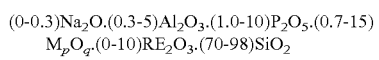

wherein M1 is a transition metal selected from Fe, Co, and Ni, M2 is a transition metal selected from Zn, Mn, Ga, and Sn, M is a transition metal selected from Fe, Co, Ni, Cu, Zn, Mo or Mn, and RE represents a rare earth metal; x is 1 or 2, when x is 1, the value of y is a half of the valence of the transition metal M1, and when x is 2, the value of y is the valence of the transition metal M1; m is 1 or 2, when m is 1, the value of n is a half of the valence of the transition metal M2, and when m is 2, the value of n is the valence of the transition metal M2; p is 1 or 2, when p is 1, the value of q is a half of the valence of the transition metal M, and when p is 2, the value of q is the valence of the transition metal M. The catalyst also contains an assistant catalytic component, which is one or more selected from the group consisting of alkali earth metals, Group IVB metals, non-noble metals in Group VIII, and rare earth metals of the Periodic Table of the Elements. The catalyst contains, based on the weight of the catalyst, 1-60% by weight of a zeolite, 0.1-10% by weight of an assistant catalytic component, 5-98% by weight of a thermotolerant inorganic oxide, and 0-70% by weight of a clay in terms of the oxide.

The process provided by the present invention for converting hydrocarbon oils comprises bringing a hydrocarbon oil into contact with a catalyst, wherein the contact is carried out under a steam-containing atmosphere and the conditions for the contact include a contact temperature of 450-750° C., a catalyst/oil weight ratio of 4-40, and a steam amount of 1-100% by weight of the hydrocarbon oil. The catalyst is the aforesaid catalyst provided by the present invention.

The process provided by the present invention for preparing the catalyst comprises mixing and slurrying all or partial thermotolerant inorganic oxide and/or its precursor, water, and optionally a clay, adding a zeolite, drying the obtained slurry, and then calcining, wherein an assistant compound is also added before adding the zeolite and before or after adding the clay, adding an acid to bring the pH value of the slurry to 1-5, aging at a temperature of 30-90° C. for 0.1-10 h, and adding the remaining thermotolerant inorganic oxide and/or its precursor after aging. The zeolite is an MFI-structured zeolite containing phosphor and transition metal(s) or a mixture of the MFI-structured zeolite containing phosphor and transition metal(s) with a macroporous zeolite which comprises, based on the weight of the mixture, 75-100% by weight of the MFI-structured zeolite containing phosphor and transition metal(s) and 0-25% by weight of the macroporous zeolite. The MFI-structured zeolite containing phosphor and transition metal(s) has one of the anhydrous chemical formulas as described above.

The catalyst provided by the present invention has excellent activity and stability and exhibits increased ability to convert petroleum hydrocarbons and a high yield for propylene, ethylene, and light aromatics because the catalyst uses a modified MFI-structured zeolite containing phosphor and transition metal(s) or a mixture of the MFI-structured zeolite and a macroporous zeolite as the active component and simultaneously contains an assistant catalytic component with a modification ability.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

A catalyst provided according to the present invention contains, based on the weight of the catalyst, 1-60% by weight of a zeolite, 0.1-10% by weight of an assistant catalytic component, 5-98% by weight of a thermotolerant inorganic oxide, and 0-70% by weight of a clay. Preferably, the catalyst contains 10-50% by weight of a zeolite, 0.5-8% by weight of an assistant catalytic component, 10-70% by weight of a thermotolerant inorganic oxide, and 0-60% by weight of a clay.

Preferably, in terms of the mass of the oxide, said MFI-structured zeolite containing phosphor and transition metal(s) has an anhydrous chemical formula selected from:

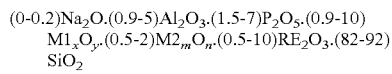
$(0-0.2)Na_2O.(0.9-5)Al_2O_3.(1.5-7)P_2O_5.(0.9-10)$
$M1_xO_y.(0.5-2)M2_mO_n.(0.5-10)RE_2O_3.(82-92)$
$SiO_2$      I and

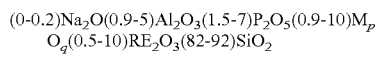
$(0-0.2)Na_2O(0.9-5)Al_2O_3(1.5-7)P_2O_5(0.9-10)M_pO_q(0.5-10)RE_2O_3(82-92)SiO_2$      II Preferably, M1 is Fe and M2 is Zn, and more preferably, M1 is Fe and M2 is Zn. Preferably, M is selected from Fe, Co or Ni.

The rare earth metal (RE) is preferably lanthanum, cerium, or mixed rare earth metals containing lanthanum and/or cerium.

The assistant catalytic component is preferably one or more selected from the group consisting of barium, calcium, magnesium, zirconium, titanium, lanthanum, cerium, iron, cobalt, and nickel. The assistant catalytic component may exist either as an oxide or salt of the aforesaid metals, or as a compound formed by reaction with a thermotolerant inorganic oxide and/or clay. The assistant catalytic component may be dispersed in a thermotolerant inorganic oxide, in a clay, or in a mixture of oxide and clay.

The macroporous zeolite is one or more porous zeolite with pores size greater than 0.7 nm such as faujasite, Zeolite-L, zeolite-β, zeolite-Ω, mordenite, and ZSM-18 zeolite, especially one or more of Zeolite-Y, Zeolite-Y containing phosphor and/or rare earth, ultrastable Zeolite-Y, and ultrastable Zeolite-Y containing phosphor and/or rare earth, and zeolite-β.

The thermotolerant inorganic oxide is selected from one or more of thermotolerant inorganic oxides used as matrix and binder components of cracking catalysts such as alumina, silica, and amorphous silica-alumina. These thermotolerant inorganic oxides are known to the skilled in the art.

The clay is selected from one or more of the clays used as the carrier of the cracking catalyst, such as kaolin, halloysite, montmorillonite, kieselguhr, endellite, saponite, rectorite, sepiolite, attapulgite, hydrotalcite, and bentonite. More preferred clay is one or more of kaolin, halloysite, and montmorillonite. These clays are known to one of ordinary skill in the art.

According to the process for preparing the catalyst of the present invention, before aging, all or partial thermotolerant inorganic oxide and/or its precursor may be added. In order to endow the catalyst with better attrition resistance ability, it is preferred that a part of the thermotolerant inorganic oxide and/or its precursor is added, and after aging, the remaining thermotolerant inorganic oxide and/or its precursor is added. The previously added part and the subsequently added part allow the weight ratio of the previously added thermotolerant inorganic oxide to the subsequently added thermotolerant inorganic oxide to be 1:0.1-10 in catalyst, more preferably 1:0.1-5.

The clay may be added either before or after aging and the sequence for adding said clay has no effect on the performance of the catalyst.

The acid is one or more selected from water-soluble inorganic or organic acids and the preferred acid is one or more of hydrochloric acid, nitric acid, phosphoric acid, and carboxylic acids with 1-10 carbon atoms. The amount of the acid allows the pH value of the slurry to be 1-5, preferably 1.5-4.

The aging temperature is 30-90° C., preferably 40-80° C., and the aging time is 0.1-10 h, preferably 0.5-8 h.

The precursor of the thermotolerant inorganic oxide is one or more of the substances which are able to form said thermotolerant inorganic oxide during the preparation course of the catalyst. For example, the precursor of alumina may be selected from hydrated alumina and/or alumina sol, wherein the hydrated alumina is one or more selected from boehmite, pseudo-boehmite, trihydrated alumina, and amorphous aluminum hydroxide. The precursor of silica may be one or more selected from silica sol, silica gel, and water-glass. The precursor of amorphous silica-alumina may be one or more selected from silica-alumina sol, mixtures of silica sol and alumina sol, and silica-alumina gel. These precursors of the thermotolerant inorganic oxides are known to one of ordinary skill in the art.

The assistant compound is selected from one or more of the compounds of water-soluble or water-insoluble alkali earth metals, Group IVB metals, non-noble metals in Group VIII, and rare earth metals, especially one or more of water-soluble or water-insoluble compounds of barium, calcium, magnesium, zirconium, titanium, lanthanum, cerium, iron, cobalt, and nickel, such as halides, nitrates, sulfates, and phosphates of barium, calcium, magnesium, zirconium, titanium, lanthanum, cerium, iron, cobalt, and nickel. Chlorides of barium, calcium, magnesium, zirconium, titanium, lanthanum, cerium, iron, cobalt, and nickel are preferred among said halides of barium, calcium, magnesium, zirconium, titanium, lanthanum, cerium, iron, cobalt, and nickel.

The amounts of various components allow the final catalyst to contain 1-60% by weight of a zeolite, 0.1-10% by weight of an assistant catalytic component, 5-98% by weight of a thermotolerant inorganic oxide, and 0-70% by weight of a clay based on the weight of the catalyst. It is preferred that the amounts of various components allow the final catalyst to contain 10-50% by weight of a zeolite, 0.5-8% by weight of an assistant catalytic component, 10-70% by weight of a thermotolerant inorganic oxide, and 0-60% by weight of a clay based on the weight of the catalyst.

The process and conditions for drying the slurry are known to one of ordinary skill in the art. For example, the process for drying may be air drying, baking, forced-air drying, or spray-drying, preferably spray-drying, and the temperature for drying may be from room temperature to 400° C., preferably 100-350° C. To facilitate spray-drying, the solid content of the slurry before drying is preferably 10-50% by weight, more preferably 20-50% by weight.

The conditions for calcination after drying of said slurry are also known to one of ordinary skill in the art. Generally speaking, the temperature for calcination said slurry after drying is all 400-700° C., preferably 450-650° C., and the time for calcination is at least 0.5 h, preferably 0.5-100 h, and more preferably 0.5-10 h.

The process for preparing said MFI-structured zeolite containing phosphor and transition metal(s) comprises incorporating phosphor and aforesaid transition metal(s) into an MFI-structured zeolite containing or not containing rare earth.

The process for incorporating phosphor and transition metal(s) into the MFI-structured zeolite containing or not containing rare earth may be diverse. For example, the incorporation may be carried out during the course of synthesizing the MFI-structured zeolite containing or not containing rare earth, or by means of impregnation, mixing, and/or ion-exchange. Aforesaid processes for incorporating phosphor and transition metal(s) into the MFI-structured zeolite containing or not containing rare earth are known to one of ordinary skill in the art.

For example, said MFI-structured zeolite containing phosphor and transition metals of formula (I) may be prepared by the following process: a sodium-type zeolite containing or not containing rare earth obtained by conventional crystallization is exchanged in a zeolite/ammonium salt/$H_2O$ weight ratio of 1:(0.1-1):(5-10) at a temperature between room temperature and 100° C. for 0.3-1 h, and then filtered to yield an ammonium-exchanged zeolite filter cake. Subsequently, a phosphor compound, a compound selected from the compounds of Fe, Co, and Ni, and a compound selected from the compounds of Zn, Mn, Ga, and Sn are incorporated by impregnation or ion-exchange, and then dried, and calcined under an air or steam atmosphere at 400-800° C. for 0.5-8 h.

If the MFI-structured sodium-type zeolite contains an organic template, the aforesaid operation should be carried out after removing the template, wherein said ammonium salt may be one selected from commonly used inorganic ammonium salts, such as ammonium chloride, ammonium sulfate, and ammonium nitrate, or mixtures thereof.

The impregnation or ion-exchange may be any of the following modes:

Mode 1: the ammonium-exchanged zeolite filter cake and an aqueous solution of a phosphor compound are uniformly mixed at a temperature between room temperature and 95° C., then dried, and optionally calcined at 400-800° C. The resultant solid is uniformly mixed with a mixed aqueous solution of a metal compound selected from Fe, Co, and Ni compounds and a metal compound selected from Zn, Mn, Ga, and Sn compounds at a temperature between room temperature and 95° C., then dried, and optionally calcined. The sequence of the two mixing steps may be reversed.

Mode 2: the ammonium-exchanged zeolite filter cake and an aqueous solution of a phosphor compound are uniformly mixed at a temperature between room temperature and 95° C., then dried, and optionally calcined at 400-800° C. The resultant solid is uniformly mixed with an aqueous solution of a metal compound selected from metal Fe, Co, and Ni compounds at a temperature between room temperature and 95° C., then dried, and optionally calcined at 400-800° C. The resultant solid is uniformly mixed with an aqueous solution of a metal compound selected from Zn, Mn, Ga, and Sn compounds at a temperature between room temperature to 95° C., then dried, and optionally calcined. The sequence of the above three mixing steps may be arbitrary.

Mode 3: the ammonium-exchanged zeolite filter cake is uniformly mixed with a mixed aqueous solution of a phosphor compound, a metal compound selected from Fe, Co, and Ni compounds, and a metal compound selected from Zn, Mn, Ga, and Sn compounds at a temperature between room temperature and 95° C., then dried, and optionally calcined.

Mode 4: the ammonium-exchanged zeolite filter cake and an aqueous solution of a phosphor compound are uniformly mixed at a temperature between room temperature and 95° C., then dried, and optionally calcined at 400-800° C. The resultant solid is uniformly mixed with an aqueous solution of a metal compound selected from Fe, Co, and Ni compounds, or an aqueous solution of a metal compound selected from Zn, Mn, Ga, and Sn compounds, or a mixed aqueous solution of a metal compound selected from Fe, Co, and Ni compounds and a metal compound selected from Zn, Mn, Ga, and Sn compounds at a solid/liquid ratio of 1:5-20, and then exchanged at a temperature of 80-95° C., a pH value of 4-7 for 2-3 h with stirring, filtered, dried, and optionally calcined. The ion-exchange may be repeated several times.

The MFI-structured zeolite containing phosphor and transition metal of formula (II) may be prepared by the following process: the MFI-structured zeolite containing or not containing rare earth and an aqueous solution of a phosphor compound are uniformly mixed at a temperature between room temperature and 95° C., then dried, and calcined at 400-800° C. The resultant solid is uniformly mixed with an aqueous solution of a compound of the transition metal M at a temperature between room temperature and 95° C., then dried. Alternatively, the MFI-structured zeolite containing or not containing rare earth and an aqueous solution of a compound of the transition metal M are uniformly mixed at a temperature between room temperature and 95° C., then dried. The resultant solid is uniformly mixed with an aqueous solution of a phosphor compound at a temperature between room temperature and 95° C., then dried. Alternatively, the MFI-structured zeolite containing or not containing rare earth and a mixed aqueous solution of a compound of the transition metal M and a phosphor compound are uniformly mixed at a temperature between room temperature and 95° C., then dried. Alternatively, the MFI-structured zeolite containing or not containing rare earth and an aqueous solution of a phosphor compound are uniformly mixed at a temperature between room temperature and 95° C., then dried, and calcined at 400-800° C. The resultant solid is uniformly mixed with an aqueous solution of a compound of the transition metal M at a solid/liquid ratio of 1:5-20, then exchanged at least once at a temperature of 80-95° C., a pH value of 4-7 for 2-3 h with stirring, then filtered, and then dried.

The phosphor compound is one or more selected from water-soluble phosphor compounds, preferably phosphoric acid, diammonium hydrogen phosphate, ammonium dihydrogen phosphate, and ammonium phosphate.

The Fe, Co, and Ni compound and Zn, Mn, Ga, and Sn compound are selected from their water-soluble salts, such as sulfates, nitrates, and chlorides. The compound of the transition metal M is selected from the water-soluble salts thereof, such as one or more of the chlorides, nitrates, sulfates, or carbonates of the transition metal M. Preferably, the compound of the transition metal M is one or more selected from the group consisting of ferric sulfate, ferrous sulfate, ferric nitrate, ferric chloride, ferrous chloride, cobalt sulfate, cobalt nitrate, cobalt chloride, nickel, sulfate, nickel nitrate and nickel chloride.

The method for the drying after impregnation or ion-exchange may be any drying method, such as air drying, baking, etc. The drying temperature may be a temperature between room temperature and 400° C., preferably 100-200° C. The calcination temperature after drying is a conventional calcination temperature, generally 400-800° C., and preferably 450-700° C.

The amounts of various components should ensure that the composition of the obtained MFI-structured zeolite containing phosphor and transition metal(s) accords with the anhydrous chemical formula of the zeolite. If the content of sodium therein does not meet the requirement, sodium may be removed by washing or carrying out ammonium-exchange. The methods for removing sodium by washing or carrying out ammonium-exchange are known to those of ordinary skill in the art.

The process provided by the present invention for converting hydrocarbon oils may be carried out in various reactors such as a riser reactor, fluidized-bed reactor, fixed-bed reactor, or moving-bed reactor.

The contact conditions include a contact temperature of 450-750° C., a catalyst/oil weight ratio of 4-40, and a steam amount of 1-100% by weight of the feed oil. Preferably, the contact conditions include a contact temperature of 500-700° C., a catalyst/oil weight ratio of 5-30, and a steam amount of 10-90% by weight of the feed oil.

For a fluidized-bed reactor, fixed-bed reactor, or moving-bed reactor, the contact conditions also include a weight hourly space velocity of 5-30 h$^{-1}$, preferably 5-25 h$^{-1}$. For a riser reactor, the contact conditions also include a reaction time of 0.1-5.0 s, preferably 0.2-3.5 s.

The catalyst provided by the present invention may be used with prior catalytic cracking or catalytic pyrolysis technology for producing light olefins and increasing the yield of light olefins, especially increasing the yield of propylene and ethylene, and increasing the content of light aromatics in gasoline at the same time. This catalyst can also be used with a new hydrocarbon converting technology to catalytically convert heavy oil fractions into light olefins, especially propylene and ethylene, and light aromatics.

The process provided by the present invention for converting hydrocarbon oils can catalytically convert various hydrocarbon oils to produce light olefins, especially propylene and ethylene, and increase the content of light aromatics in gasoline at the same time, or produce light olefins, especially propylene and ethylene, and light aromatics. The hydrocarbon oil is one or more selected from the group consisting of petroleum and its various fractions, especially petroleum and the fractions with boiling points higher than 330° C., such as atmospheric residuum, vacuum residuum, vacuum gas oil, atmospheric gas oil, straight-run gas oil, deasphalted oil, and coker gas oil.

The following examples will further describe the present invention, but will not thereby restrict the present invention.

Examples 1-8 illustrate MFI-structured zeolite containing phosphor and transition metals of formula (I) and their preparation process.

Examples 1'-8' illustrate MFI-structured zeolite containing phosphor and transition metal of formula (II) and their preparation process.

Example 1

2 kg NH$_4$Cl was dissolved in 100 kg water, and 10 kg (dry basis) ZRP-1 zeolite (an MFI-structured zeolite containing rare earth produced in The Zhoucun Catalyst Plant, Qilu Petrochemical Co. with a SiO$_2$/Al$_2$O$_3$ molar ratio of 30, a content of rare earth oxide RE$_2$O$_3$ of 4.0% by weight, wherein a content of lanthanum oxide of 2.12% by weight, that of cerium oxide of 0.52% by weight, and that of the other rare earth oxides of 1.36% by weight, and that of Na$_2$O of 1.7% by weight) was added to this solution, subjected to ion-exchange at 90° C. for 0.5 h, and then filtered to yield a filter cake. 9.8 kg mixed solution containing 0.34 kg H$_3$PO$_4$, 0.29 kg Fe(NO$_3$)$_3$, and 1.5 kg Zn(NO$_3$)$_2$ was uniformly mixed with the cake, dried at 120° C., calcined at 550° C. for 2 h to yield an MFI-structured zeolite containing phosphor, iron and zinc, Z1. The anhydrous chemical formula of Z1 was 0.1Na$_2$O.4.9Al$_2$O$_3$.2.4P$_2$O$_5$.0.9Fe$_2$O$_3$.0.6Zn O.3.8RE$_2$O$_3$.87.3SiO$_2$. The anhydrous chemical formula of the MFI-structured zeolite containing phosphor, iron and zinc was obtained by first determining the element composition of the zeolite by X-ray fluorescent spectroscopy and then calculating.

Example 2

5 kg NH$_4$Cl was dissolved in 100 kg water, and 10 kg (dry basis) ZRP-1 zeolite (the same as Example 1) was added to this solution and subjected to ion-exchange at 85° C. for 0.5 h, and then filtered to yield a filter cake. The obtained filter cake was uniformly mixed with 6.8 kg solution containing 0.8 kg NH$_4$H$_2$PO$_4$, dried at 120° C., and calcined at 550° C. for 2 h. The calcined sample was subjected to ion-exchange with a mixed solution of 6.5% by weight of FeCl$_3$ and 4.7% by weight of ZnCl$_2$ in a liquid/solid ratio of 5:1 at 80-90° C. for 2 h, then filtered, subjected to ion-exchange under the same conditions until a target amount was attained, dried at 120° C., calcined again at 550° C. for 2 h to yield an MFI-structured zeolite containing phosphor, iron and zinc, Z2. The anhydrous chemical formula of Z2 was 0.03Na$_2$O.4.7Al$_2$O$_3$.4.5P$_2$O$_5$.1.6Fe$_2$O$_3$.1.4Zn O.3.7RE$_2$O$_3$.84.1SiO$_2$.

Example 3

2 kg NH$_4$Cl was dissolved in 100 kg water, and 10 kg (dry basis) ZRP-5 zeolite (an MFI-structured zeolite produced in The Zhoucun Catalyst Plant, Qilu Petrochemical Co. with a SiO$_2$/Al$_2$O$_3$ molar ratio of 60) was added to this solution and subjected to ion-exchange at 90° C. for 0.5 h, and then filtered to yield a filter cake. The obtained filter cake was uniformly mixed with 6.7 kg solution containing 0.69 kg NH$_4$H$_2$PO$_4$ and dried at 120° C. The dried sample was uniformly mixed with 11.3 kg solution containing 2.26 kg FeSO$_4$, dried at 120° C., and calcined at 550° C. for 2 h. The calcined sample was uniformly mixed with 9.5 kg solution containing 0.47 kg ZnSO$_4$, dried at 120° C., and calcined at 550° C. for 2 h to yield an MFI-structured zeolite containing phosphor, iron and zinc, Z3. The anhydrous chemical formula of Z3 was 0.1Na$_2$O.2.3Al$_2$O$_3$.3.6P$_2$O$_5$.10.0Fe$_2$O$_3$.2.0ZnO.82.0SiO$_2$.

Example 4

8 kg NH$_4$Cl was dissolved in 100 kg water, and 10 kg (dry basis) ZRP-5 zeolite (the same as Example 3) was added to this solution and subjected to ion-exchange at 85° C. for 0.5 h, and then filtered to yield a filter cake. The obtained filter cake was uniformly mixed with 6.7 kg solution containing 0.69 kg NH$_4$H$_2$PO$_4$ and dried at 120° C. The dried sample was uniformly mixed with 9.7 kg mixed solution containing 0.49 kg Fe(NO$_3$)$_3$ and 0.24 kg Mn(NO$_3$)$_2$, dried at 120° C., and calcined at 600° C. for 2 h to yield an MFI-structured zeolite containing phosphor, iron and manganese, Z4. The anhydrous chemical formula of Z4 was 0.1Na$_2$O.2.6Al$_2$O$_3$.4.0P$_2$O$_5$.1.5Fe$_2$O$_3$.1.1Mn$_2$O$_3$.90.7SiO$_2$.

Example 5

8 kg NH$_4$Cl was dissolved in 100 kg water, and 10 kg (dry basis) ZRP-5 zeolite (an MFI-structured zeolite produced in The Zhoucun Catalyst Plant, Qilu Petrochemical Co. with a SiO$_2$/Al$_2$O$_3$ molar ratio of 70) was added to this solution and subjected to ion-exchange at 85° C. for 0.5 h, and then filtered to yield a filter cake. The obtained filter cake was uniformly mixed with 6.3 kg solution containing 0.26 kg $NH_4H_2PO_4$ and dried at 120° C. The dried sample was uniformly mixed with 10.1 kg solution containing 0.82 kg $Co(NO_3)_2$ and 0.24 kg $Mn(NO_3)_2$, dried at 120° C., and calcined at 600° C. for 2 h to yield an MFI-structured zeolite containing phosphor, cobalt and manganese, Z5. The anhydrous chemical formula of Z5 was $0.1Na_2O.2.2Al_2O_3.1.5P_2O_5.3.5CO_2O_3.1.1Mn_2O_3.91.6SiO_2$.

Example 6

8 kg $NH_4Cl$ was dissolved in 100 kg water, and 10 kg (dry basis) ZRP-5 zeolite (the same as Example 3) was added to this solution and subjected to ion-exchange at 85° C. for 0.5 h, and then filtered to yield a filter cake. The obtained filter cake was uniformly mixed with 6.7 kg solution containing 0.70 kg $(NH_4)_2HPO_4$ and dried at 120° C. The dried sample was uniformly mixed with 9.7 kg solution containing 0.52 kg $Ni(NO_3)_2$ and 0.22 kg $Mn(NO_3)_2$, dried at 120° C., and calcined at 600° C. for 2 h to yield an MFI-structured zeolite containing phosphor, nickel and manganese, Z6. The anhydrous chemical formula of Z6 was $0.1Na_2O.2.6Al_2O_3.3.5P_2O_5.2.0NiO.1.0Mn_2O_3.90.8SiO_2$.

Example 7

8 kg $NH_4Cl$ was dissolved in 100 kg water, and 10 kg (dry basis) ZRP-1 zeolite (the same as Example 1) was added to this solution and subjected to ion-exchange at 85° C. for 0.5 h, and then filtered to yield a filter cake. The obtained filter cake was uniformly mixed with 6.5 kg solution containing 0.47 kg $(NH_4)_2HPO_4$ and dried at 120° C. The dried sample was uniformly mixed with 9.8 kg solution containing 0.51 kg $Fe(NO_3)_3$ and 0.32 kg $Ga(NO_3)_3$, dried at 120° C., and calcined at 600° C. for 2 h to yield an MFI-structured zeolite containing phosphor, iron and gallium, Z7. The anhydrous chemical formula of Z7 was $0.1Na_2O.4.9Al_2O_3.2.4P_2O_5.1.6Fe_2O_3.1.1Ga_2O_3.3.8RE_2O_3.86.1SiO_2$.

Example 8

8 kg $NH_4Cl$ was dissolved in 100 kg water, and 10 kg (dry basis) ZRP-5 zeolite (the same as Example 3) was added to this solution and subjected to ion-exchange at 85° C. for 0.5 h, and then filtered to yield a filter cake. The obtained filter cake was uniformly mixed with 7.0 kg solution containing 0.95 kg $NH_4H_2PO_4$ and dried at 120° C. The dried sample was uniformly mixed with 9.5 kg solution containing 0.35 kg $FeCl_3$ and 0.14 kg $SnCl_2$, dried at 120° C., and calcined at 600° C. for 2 h to yield an MFI-structured zeolite containing phosphor, iron and tin, Z8. The anhydrous chemical formula of Z8 was $0.07Na_2O.2.5Al_2O_3.5.4P_2O_5.1.6Fe_2O_3 1.0SnO_2.89.4SiO_2$.

Example 1'

2 kg $NH_4Cl$ was dissolved in 100 kg water, and 10 kg (dry basis) ZRP-1 zeolite (the same as Example 1) was added to this solution, subjected to ion-exchange at 90° C. for 0.5 h, and then filtered to yield a filter cake. 9.88 kg mixed solution containing 0.34 kg $H_3PO_4$, 0.48 kg $Fe(NO_3)_3$ was uniformly mixed with the cake, dried at 120° C., calcined at 550° C. for 2 h to yield an MFI-structured zeolite containing phosphor, and iron, Z1'. The anhydrous chemical formula of Z1' was $0.1Na_2O.4.9Al_2O_3.2.4P_2O_5.1.5Fe_2O_3.3.8RE_2O_3.87.3SiO_2$.

Example 2'

5 kg $NH_4Cl$ was dissolved in 100 kg water, and 10 kg (dry basis) ZRP-1 zeolite (the same as Example 1) was added to this solution and subjected to ion-exchange at 85° C. for 0.5 h, and then filtered to yield a filter cake. The obtained filter cake was uniformly mixed with 6.8 kg solution containing 0.8 kg $NH_4H_2PO_4$, dried at 120° C., and calcined at 550° C. for 2 h. The calcined sample was subjected to ion-exchange with a solution of 5% by weight of $Fe(NO_3)_3$ in a liquid/solid ratio of 5:1 at 80-90° C. for 2 h, then filtered, subjected to ion-exchange under the same conditions until a target amount of iron was attained, dried at 120° C., calcined again at 550° C. for 2 h to yield an MFI-structured zeolite containing phosphor and iron, Z2'. The anhydrous chemical formula of Z2' was $0.03Na_2O.4.7Al_2O_3.4.5P_2O_5.3.0Fe_2O_3.3.7RE_2O_3.84.1SiO_2$.

Example 3'

2 kg $NH_4Cl$ was dissolved in 100 kg water, and 10 kg (dry basis) ZRP-5 zeolite (the same as Example 3) was added to this solution and subjected to ion-exchange at 90° C. for 0.5 h, and then filtered to yield a filter cake. The obtained filter cake was uniformly mixed with 12.8 kg solution containing 0.32 kg $H_3PO_4$ and 3.42 kg $Fe(NO_3)_3$, dried at 120° C., and calcined at 550° C. for 2 h to yield an MFI-structured zeolite containing phosphor and iron, Z3'. The anhydrous chemical formula of Z3' was $0.1Na_2O.2.4Al_2O_3.2.0P_2O_5.10Fe_2O_3.85.5SiO_2$.

Example 4'

8 kg $NH_4Cl$ was dissolved in 100 kg water, and 10 kg (dry basis) ZRP-5 zeolite (the same as Example 3) was added to this solution and subjected to ion-exchange at 85° C. for 0.5 h, and then filtered to yield a filter cake. The obtained filter cake was uniformly mixed with 6.89 kg solution containing 0.89 kg $NH_4H_2PO_4$ and dried at 120° C. The dried sample was uniformly mixed with 9.52 kg solution containing 0.52 kg $FeSO_4.6H_2O$, dried at 120° C., and calcined at 600° C. for 2 h to yield an MFI-structured zeolite containing phosphor and iron, Z4'. The anhydrous chemical formula of Z4' was $0.1Na_2O.2.6Al_2O_3.5.1P_2O_5.1.5Fe_2O_3.90.7SiO_2$.

Example 5'

8 kg $NH_4Cl$ was dissolved in 100 kg water, and 10 kg (dry basis) ZRP-5 zeolite (the same as Example 5) was added to this solution and subjected to ion-exchange at 85° C. for 0.5 h, and then filtered to yield a filter cake. The obtained filter cake was uniformly mixed with 6.89 kg solution containing 0.89 kg $NH_4H_2PO_4$ and dried at 120° C. The dried sample was uniformly mixed with 9.35 kg solution containing 0.35 kg $FeSO_4.6H_2O$, dried at 120° C., and calcined at 600° C. for 2 h to yield an MFI-structured zeolite containing phosphor and iron, Z5'. The anhydrous chemical formula of Z5' was $0.1Na_2O.2.2Al_2O_3.5.1P_2O_5.1.0Fe_2O_3.91.6SiO_2$.

Example 6'

8 kg $NH_4Cl$ was dissolved in 100 kg water, and 10 kg (dry basis) ZRP-5 zeolite (the same as Example 3) was added to this solution and subjected to ion-exchange at 85° C. for 0.5 h, and then filtered to yield a filter cake. The obtained filter cake was uniformly mixed with 6.9 kg solution containing 0.9 kg (NH$_4$)$_2$HPO$_4$ and dried at 120° C. The dried sample was uniformly mixed with 9.83 kg solution containing 0.83 kg Ni(NO$_3$)$_2$.6H$_2$O, dried at 120° C., and calcined at 600° C. for 2 h to yield an MFI-structured zeolite containing phosphor and nickel, Z6'. The anhydrous chemical formula of Z6' was 0.1Na$_2$O.2.6Al$_2$O$_3$.4.5P$_2$O$_5$.2.0NiO.90.8SiO$_2$.

Example 7'

8 kg NH$_4$Cl was dissolved in 100 kg water, and 10 kg (dry basis) ZRP-1 zeolite (the same as Example 1) was added to this solution and subjected to ion-exchange at 85° C. for 0.5 h, and then filtered to yield a filter cake. The obtained filter cake was uniformly mixed with 6.84 kg solution containing 0.84 kg (NH)$_2$HPO$_4$ and dried at 120° C. The dried sample was uniformly mixed with 9.39 kg solution containing 0.39 kg Ni(NO$_3$)$_{2-6}$H$_2$O, dried at 120° C., and calcined at 600° C. for 2 h to yield an MFI-structured zeolite containing phosphor and nickel, Z7'. The anhydrous chemical formula of Z7' was 0.1Na$_2$O.4.9Al$_2$O$_3$.4.1P$_2$O$_5$.1.0NiO$_3$.3.8RE$_2$O$_3$.86.1SiO$_2$.

Example 8'

8 kg NH$_4$Cl was dissolved in 100 kg water, and 10 kg (dry basis) ZRP-5 zeolite (the same as Example 3) was added to this solution and subjected to ion-exchange at 85° C. for 0.5 h, and then filtered to yield a filter cake. The obtained filter cake was uniformly mixed with 6.89 kg solution containing 0.89 kg NH$_4$H$_2$PO$_4$ and dried at 120° C. The dried sample was uniformly mixed with 10.06 kg solution containing 1.06 kg FeSO$_4$.6H$_2$O, dried at 120° C., and calcined at 600° C. for 2 h to yield an MFI-structured zeolite containing phosphor and iron, Z8'. The anhydrous chemical formula of Z8' was 0.07Na$_2$O.2.5Al$_2$O$_3$.5.0P$_2$O$_5$.3.0Fe$_2$O$_3$.89.4SiO$_2$.

Example 9

The present example illustrates a catalyst provided by the present invention and its preparation process.

0.34 kg Ba(NO$_3$)$_2$ was dissolved in 18 kg decationized water, whereto 4.2 kg halloysite (an industrial product of Suzhou Kaolin Co. with a solid content of 71.6% by weight) was added and slurried. 3.2 kg pseudo-boehmite (an industrial product of Shandong Alumina Plant with a solid content of 62.0% by weight) was added to the obtained slurry, and the pH value was adjusted to 2 with hydrochloric acid. The slurry was uniformly stirred and aged at 70° C. for 1 h, and then 3.7 kg alumina sol (product of the Zhoucun Catalyst Plant, Qilu Petrochemical Co. with an Al$_2$O$_3$ content of 21.5% by weight, the amounts of the precursor of the thermotolerant inorganic oxide added before and after aging allowed the ratio of the thermotolerant inorganic oxide added before and after aging to be 1:0.4) was added. After uniformly stirring, 11.4 kg slurry obtained by slurrying a mixture of 3.5 kg (dry basis) MFI-structured zeolite containing phosphor, iron and zinc, Z1 prepared in Example 1 and 0.5 kg (dry basis) ultrastable Zeolite-Y (industrial brand DASY2.0, product of the Zhoucun Catalyst Plant, Qilu Petrochemical Co. with a unit cell size of 2.446 nm, a content of rare earth oxides RE$_2$O$_3$ of 2.0% by weight, wherein a content of lanthanum oxide of 1.06% by weight, that of cerium oxide of 0.26% by weight, that of other rare earth oxides of 0.68% by weight) with water was added, and uniformly stirred to yield a slurry with a solid content of 24.5% by weight. The obtained slurry was spray-dried and shaped into particles with diameters of 20-150 μm at 250° C., which were calcined at 550 for 2 h to yield catalyst C1 provided by the present invention. The composition of C1 is shown in Table 1.

Example 10

The present example illustrates a catalyst provided by the present invention and its preparation process.

A catalyst C2 was prepared according to the process of Example 9, except that 0.34 kg Ba(NO$_3$)$_2$ was replaced by 0.46 kg LaCl$_3$.7H$_2$O, and that Z1 was replaced by equal amount of the MFI-structured zeolite containing phosphor, iron and zinc, Z2 prepared in Example 2. The composition of C2 is shown in Table 1.

Example 11

The present example illustrates a catalyst provided by the present invention and its preparation process.

A catalyst C3 was prepared according to the process of Example 9, except that 0.34 kg Ba(NO$_3$)$_2$ was replaced by 0.17 kg Ba(NO$_3$)$_2$ and 0.34 kg FeCl$_3$.6H$_2$O, and that Z1 was replaced by equal amount of the MFI-structured zeolite containing phosphor, iron and gallium, Z7 prepared in Example 7. The composition of C3 is shown in Table 1.

Example 9'

The present example illustrates a catalyst provided by the present invention and its preparation process.

A catalyst C1' was prepared according to the process of Example 9, except that Z1 was replaced by equal amount of the MFI-structured zeolite containing phosphor and iron, Z1' prepared in Example 1'. The composition of C1' is shown in Table 1.

Example 10'

The present example illustrates a catalyst provided by the present invention and its preparation process.

A catalyst C2' was prepared according to the process of Example 10, except that Z2 was replaced by equal amount of the MFI-structured zeolite containing phosphor and iron, Z2' prepared in Example 2'. The composition of C2' is shown in Table 1.

Example 11

The present example illustrates a catalyst provided by the present invention and its preparation process.

A catalyst C3' was prepared according to the process of Example 11, except that Z7 was replaced by equal amount of the MFI-structured zeolite containing phosphor and nickel, Z7' prepared in Example 7'. The composition of C3' is shown in Table 1.

Comparative Example 1

The present comparative example illustrates a comparative catalyst containing an MFI-structured zeolite, which contains no phosphor and transition metal(s), and its preparation process.

A comparative catalyst CB1 was prepared according to the process of Example 9, except that the MFI-structured zeolite containing phosphor, iron and zinc, Z1 prepared in Example 1 was replaced by ZRP-1 zeolite (the same as Example 1). The composition of CB1 is shown in Table 1.

Comparative Example 2

The present comparative example illustrates a comparative catalyst containing no assistant catalytic component, and its preparation process.

A comparative catalyst CB2 was prepared according to the process of Example 9, except that no $Ba(NO_3)_2$ was added and the amount of alumina sol was 4.7 kg. The composition of CB2 is shown in Table 1.

Comparative Example 3

The present comparative example illustrates a comparative catalyst which contains an MFI-structured zeolite containing no phosphor and transition metal(s), and contains no assistant catalytic component, and its preparation process.

A comparative catalyst CB3 was prepared according to the process of Example 9, except that no $Ba(NO_3)_2$ was added, the amount of alumina sol was 4.7 kg, and the MFI-structured zeolite containing phosphor, iron and zinc prepared in Example 1, Z1 was replaced by ZRP-1 zeolite (the same as Example 1). The composition of CB3 is shown in Table 1.

slurrying 3 kg (dry basis) MFI-structured zeolite containing phosphor, iron and zinc, Z3 prepared in Example 3 and 1 kg (dry basis) ultrastable Zeolite-Y (industrial brand USY, product of the Zhoucun Catalyst Plant, Qilu Petrochemical Co. with a unit cell size of 2.445 nm, a content of sodium oxide of 0.36% by weight) with water were added, and uniformly stirred to yield a slurry with a solid content of 27.4% by weight. The obtained slurry was spray-dried and shaped into particles with diameters of 20-150 μm at 220° C., which were calcined at 520 for 4 h to yield catalyst C4 provided by the present invention. The composition of C4 is shown in Table 2.

Example 13

The present invention illustrates a catalyst provided by the present invention and its preparation process.

0.17 kg $Ba(NO_3)_2$ was dissolved in 18 kg decationized water, to which 3.0 kg halloysite (the same as Example 9) and 0.9 kg montmorillonite (with a solid content of 95% by weight, produced by Zhejiang Fenghong Chemical Clay Ltd.) were added and slurried. Then 4.0 kg pseudo-boehmite (the same as Example 9) was added, and the pH value was adjusted to 3.5 with hydrochloric acid. The obtained slurry was uniformly stirred, and sulfuric acid in a mole amount

TABLE 1

| Catalyst | Example 9 C1 | Example 10 C2 | Example 11 C3 | Example 9' C1' | Example 10' C2' | Example 11' C3' | Comparative Example 1 CB1 | Comparative Example 2 CB2 | Comparative Example 3 CB3 |
|---|---|---|---|---|---|---|---|---|---|
| Type of clay | Halloysite | Halloysite | Halloysite | Halloysite | Halloysite | Halloysite | Halloysite | Halloysite | Halloysite |
| Content of clay, wt. % | 30 | 30 | 30 | 30 | 30 | 30 | 30 | 30 | 30 |
| Type of thermotolerant inorganic oxide | Alumina | Alumina | Alumina | Alumina | Alumina | Alumina | Alumina | Alumina | Alumina |
| Content of thermotolerant inorganic oxide, wt. % | 28 | 28 | 28 | 28 | 28 | 28 | 28 | 30 | 30 |
| Type of assistant catalytic component | Ba | La | Fe + Ba | Ba | La | Fe + Ba | Ba | | |
| Content of assistant catalytic component (in terms of oxide), wt. % | 2 | 2 | 2 | 2 | 2 | 2 | 2 | | |
| Type of MFI-structured Zeolite | Z1 | Z2 | Z7 | Z1' | Z2' | Z7' | ZRP-1 | Z1 | ZRP-1 |
| Content of MFI-structured Zeolite, wt. % | 35 | 35 | 35 | 35 | 35 | 35 | 35 | 35 | 35 |
| Type of macroporous zeolite | DASY2.0 | DASY2.0 | DASY2.0 | DASY2.0 | DASY2.0 | DASY2.0 | DASY2.0 | DASY2.0 | DASY2.0 |
| Content of macroporous zeolite, wt. % | 5 | 5 | 5 | 5 | 5 | 5 | 5 | 5 | 5 |

Example 12

The present invention illustrates a catalyst provided by the present invention and its preparation process.

0.17 kg $Ba(NO_3)_2$ was dissolved in 12.5 kg decationized water, to which 4.0 kg pseudo-boehmite (the same as Example 9) was added, and the pH value was adjusted to 2 with nitric acid. The obtained slurry was uniformly stirred and aged at 50° C. for 5 h to yield an aged product.

1.9 kg alumina sol (the same as Example 9, the precursor of the thermotolerant inorganic oxide added before and after aging allowed the weight ratio of the thermotolerant inorganic oxide added before and after aging to be 1:0.16) was added to 2.5 kg decationized water, to which 4.0 kg kaolin (with a solid content of 76% by weight, produced by Suzhou Kaolin Co.) was added, slurried and uniformly stirred. The above aged product, and then 11.4 kg slurry obtained by equal to that of $Ba(NO_3)_2$ was added to allow barium to completely form barium sulfate precipitate. The slurry was aged at 75° C. for 5 h, to which 1.8 kg alumina sol (the same as Example 9, the precursor of the thermotolerant inorganic oxide added before and after aging allowed the weight ratio of the thermotolerant inorganic oxide added before and after aging to be 1:0.16) was added, and uniformly stirred. Then 11.4 kg slurry obtained by slurrying 3.0 kg (dry basis) MFI-structured zeolite containing phosphor, iron and manganese, Z4 prepared in Example 4 and 1.0 kg (dry basis) rare earth-containing Zeolite-HY (industrial brand REHY, product of the Zhoucun Catalyst Plant, Qilu Petrochemical Co. with a unit cell size of 2.465 nm, a content of sodium oxide of 3.2% by weight, a content of the rare earth oxides of 7.0% by weight, wherein a content of lanthanum oxide of 3.71% by weight, that of cerium oxide of 0.91% by weight, that of the other rare earth oxides of 2.38% by weight) with water was added, and uniformly stirred to yield a slurry with a solid content of 25.5% by weight. The obtained slurry was spray-dried and shaped into particles with diameters of 20-150 μm at 280° C., which were calcined at 580° C. for 2.5 h to yield catalyst C5 provided by the present invention. The composition of C5 is shown in Table 2.

Example 14

The present invention illustrates the catalyst provided by the present invention and its preparation process.

0.22 kg $CeCl_3.7H_2O$ was dissolved in 5.0 kg decationized water, and 7.0 kg halloysite (the same as Example 9) was impregnated with the obtained solution then dried at 120° C. to yield a halloysite containing 2.0% by weight of $CeO_2$.

The above prepared $CeO_2$-containing halloysite was added to 21.8 kg decationized water and slurried, to which 3.9 kg pseudo-boehmite (the same as Example 9, the precursor of the thermotolerant inorganic oxide was all added before aging) was further added, and the pH value was adjusted to 3 with hydrochloric acid. The obtained slurry was uniformly stirred, aged at 60° C. for 2 h, and 7.2 kg slurry obtained by slurrying 2.0 kg (dry basis) MFI-structured zeolite containing phosphor, cobalt and manganese, Z5 prepared in Example 5 and 0.5 kg (dry basis) ultrastable Zeolite-Y (the same as Example 9) with water was added, and uniformly stirred to yield a slurry with a solid content of 25.2% by weight. The obtained slurry was spray-dried and shaped into particles with diameters of 20-150 μm at 250° C., which were calcined at 600° C. for 1 h to yield catalyst C6 provided by the present invention. The composition of C6 is shown in Table 2.

Example 15

The present invention illustrates the catalyst provided by the present invention and its preparation process.

1.44 kg $Zr(SO_4)_2.4H_2O$ was dissolved in 18 kg decationized water, to which 5.6 kg halloysite (the same as Example 9) was added and slurried, 3.2 kg pseudo-boehmite (the same as Example 9) was further added, and the pH value was adjusted to 4 with hydrochloric acid. The obtained slurry was uniformly stirred and kept still at 60° C. for 1 h for aging, and 2.3 kg alumina sol (the same as Example 9, the precursor of the thermotolerant inorganic oxide added before and after aging allowed the weight ratio of the thermotolerant inorganic oxide added before and after aging to be 1:0.25) was added, and uniformly stirred. Then 8.6 kg slurry obtained by slurrying 2.5 kg (dry basis) MFI-structured zeolite containing phosphor, nickel and manganese, Z6 prepared in Example 6 and 0.5 kg (dry basis) ultrastable Zeolite-Y (the same as Example 9) with water was added, and uniformly stirred to yield a slurry with a solid content of 25.6% by weight. The obtained slurry was spray-dried and shaped into particles with diameters of 20-150 μm at 220° C., which were calcined at 550° C. for 2 h to yield a catalyst provided by the present invention, C7. The composition of C7 is shown in Table 2.

Example 16

The present invention illustrates the catalyst provided by the present invention and its preparation process.

0.43 kg $Ba(NO_3)_2$ and 0.57 kg $LaCl_3.7H_2O$ were dissolved in 12 kg decationized water, to which 3.2 kg pseudo-boehmite (the same as Example 9) was added and slurried, and the pH value was adjusted to 3 with hydrochloric acid. The obtained slurry was uniformly stirred and aged at 55° C. for 6 h, and 25.0 kg silica sol (with a silica content of 16.6% by weight, produced by Beijing Chemical plant) and 2.3 kg alumina sol (the same as Example 9, the precursor of the thermotolerant inorganic oxide added before and after aging allowed the weight ratio of the thermotolerant inorganic oxide added before and after aging to be 1:2.25) were added and uniformly stirred. Then 8.6 kg slurry obtained by slurrying 3.0 kg (dry basis) MFI-structured zeolite containing phosphor, iron and tin, Z8 prepared in Example 8 with water was added, and uniformly stirred to yield a slurry with a solid content of 19.2% by weight. The slurry was spray-dried and shaped into the particles with diameters of 20-150 μm at 250° C., which were calcined at 550° C. for 2 h to yield a catalyst provided by the present invention, C8. The composition of C8 is shown in Table 2.

Example 12'

The present invention illustrates a catalyst provided by the present invention and its preparation process.

A catalyst C4' was prepared according to the process of Example 12, except that Z3 was replaced by equal amount of the MFI-structured zeolite containing phosphor and iron, Z3' prepared in Example 3'. The composition of C4' is shown in Table 2.

Example 13'

The present invention illustrates a catalyst provided by the present invention and its preparation process.

A catalyst C5' was prepared according to the process of Example 13, except that Z4 was replaced by equal amount of the MFI-structured zeolite containing phosphor and iron, Z4' prepared in Example 4'. The composition of C5' is shown in Table 2.

Example 14'

The present invention illustrates the catalyst provided by the present invention and its preparation process.

A catalyst C6' was prepared according to the process of Example 14, except that Z5 was replaced by equal amount of the MFI-structured zeolite containing phosphor and iron, Z5' prepared in Example 5'. The composition of C6' is shown in Table 2.

Example 15'

The present invention illustrates the catalyst provided by the present invention and its preparation process.

A catalyst C7' was prepared according to the process of Example 15, except that Z6 was replaced by equal amount of the MFI-structured zeolite containing phosphor and nickel, Z6' prepared in Example 6'. The composition of C7' is shown in Table 2.

Example 16'

The present invention illustrates the catalyst provided by the present invention and its preparation process.

A catalyst C8' was prepared according to the process of Example 16, except that Z8 was replaced by equal amount of the MFI-structured zeolite containing phosphor and iron, Z8' prepared in Example 8'. The composition of C8' is shown in Table 2.

TABLE 2

| Catalyst | Example 12 C4 | Example 13 C5 | Example 14 C6 | Example 15 C7 | Example 16 C8 | Example 12' C4' | Example 13' C5' | Example 14' C6' | Example 15' C7' | Example 16' C8' |
|---|---|---|---|---|---|---|---|---|---|---|
| Type of clay | Kaolin | Halloysite + Montmorillonite | Halloysite | Halloysite | — | Kaolin | Halloysite + montmorillonite | Halloysite | Halloysite | — |
| Content of clay, wt. % | 30 | 30 | 50 | 40 | — | 30 | 30 | 50 | 40 | — |
| Type of thermotolerant inorganic oxide | Alumina | Alumina | Alumina | Alumina | Alumina + silica | Alumina | Alumina | Alumina | Alumina | Alumina + silica |
| Content of thermotolerant inorganic oxide, wt. % | 29 | 29 | 24 | 25 | 65 | 29 | 29 | 24 | 25 | 65 |
| Type of assistant catalytic component | Ba | Ba | Ce | Zr | Ba + La | Ba | Ba | Ce | Zr | Ba + La |
| Content of assistant catalytic component (in terms of oxide), wt. % | 1 | 1 | 1 | 5 | 5 | 1 | 1 | 1 | 5 | 5 |
| Type of MFI-structured Zeolite | Z3 | Z4 | Z5 | Z6 | Z8 | Z3' | Z4' | Z5' | Z6' | Z8' |
| Content of MFI-structured Zeolite, wt. % | 30 | 30 | 20 | 25 | 30 | 30 | 30 | 20 | 25 | 30 |
| Type of macroporous zeolite | USY | REHY | DASY2.0 | DASY2.0 | — | USY | REHY | DASY2.0 | DASY2.0 | — |
| Content of macroporous zeolite, wt. % | 10 | 10 | 5 | 5 | — | 10 | 10 | 5 | 5 | — |

Examples 17-19

The following examples show the performance of the catalyst provided by the present invention.

Catalysts C1-C3 were pretreated with 100% steam at 800° C. for 17 h, loaded into a small fluidized bed reactor in an amount of 180 g, and then a mixture of a vacuum gas oil shown in Table 3 and steam was introduced at a reaction temperature of 580° C., a catalyst/oil weight ratio of 10, a weight hourly space velocity of 10 h$^{-1}$, wherein the amount of the steam is 25% by weight of the vacuum gas oil. The results are shown in Table 4.

Examples 17'-19'

The following examples show the performance of the catalyst provided by the present invention.

Catalytic conversion was carried out according to the method in Example 17 with the same feed oil, except that the catalysts used were catalysts C1', C2', and C3'. The results are shown in Table 4.

Comparative Examples 4-6

The following comparative examples show the performance of the reference catalysts.

Catalytic conversion was carried out according to the method in Example 17 with the same feed oil, except that the catalysts used were comparative catalysts CB1, CB2, and CB3. The results are shown in Table 4.

TABLE 3

| Feed oil | Vacuum gas oil | Atmospheric residuum |
|---|---|---|
| Density (20° C.), g/cm$^3$ | 0.8730 | 0.8909 |
| Viscosity, mm$^2$/s | 8.04 | 24.84 |
| Asphaltene, wt. % | — | 0.8 |
| Conradson carbon value, wt. % | 0.15 | 4.3 |
| Boiling range | | |
| IBP | 346 | 282 |
| 10% | 411 | 370 |
| 30% | 437 | 482 |
| 50% | 462 | 553 |
| 70% | 489 | — |
| 90% | 523 | — |
| FBP | 546 | — |

TABLE 4

| Catalyst | Example 17 C1 | Example 18 C2 | Example 19 C3 | Example 17' C1' | Example 18' C2' | Example 19' C3' | Comparative Example 4 CB1 | Comparative Example 5 CB2 | Comparative Example 6 CB3 |
|---|---|---|---|---|---|---|---|---|---|
| Conversion, wt. % | 92.2 | 92.0 | 91.9 | 92.0 | 91.9 | 91.0 | 86.8 | 91.7 | 88.1 |
| Product distribution, wt. % | | | | | | | | | |
| Cracking gas | 67.5 | 67.0 | 67.2 | 67.3 | 66.8 | 66.7 | 63.4 | 66.8 | 63.9 |
| Gasoline ($C_5$-221° C.) | 18.8 | 18.7 | 18.6 | 18.7 | 18.6 | 17.9 | 18.5 | 18.4 | 19.1 |
| LCO (221-330° C.) | 4.5 | 4.6 | 4.6 | 4.8 | 4.7 | 5.5 | 8.1 | 4.8 | 6.9 |
| Heavy oil (>330° C.) | 3.3 | 3.4 | 3.5 | 3.2 | 3.4 | 3.5 | 5.1 | 3.5 | 5.0 |
| Coke | 5.9 | 6.3 | 6.1 | 6.0 | 6.5 | 6.4 | 4.9 | 6.5 | 5.1 |
| Wherein propylene | 31.3 | 31.0 | 31.4 | 31.5 | 30.9 | 31.7 | 28.3 | 29.5 | 27.8 |
| Wherein ethylene | 10.2 | 10.1 | 9.9 | 10.3 | 10.1 | 9.8 | 8.8 | 9.2 | 8.6 |
| Wherein BTX* | 6.1 | 6.0 | 5.9 | 5.9 | 5.8 | 6.0 | 5.7 | 5.8 | 5.7 |

*BTX denotes benzene, toluene, and xylene.

The results in Table 4 indicate that, compared to the MFI-structured zeolite catalyst containing no phosphor and transition metal(s), which had been pretreated at the same conditions and contained the same amount of zeolite, the catalyst provided by the present invention had substantially higher ability to convert heavy oils, higher yields of cracked gas, especially propylene, ethylene, and BTX. Compared to the catalyst containing the same content and same type of zeolite but containing no assistant catalytic component, the catalyst provided by the present invention had higher yields of propylene, ethylene, and BTX and lower yield of coke. This indicates that the catalyst provided by the present invention had excellent activity stability and selectivity.

Examples 20-24

The following examples show the performance of the catalyst provided by the present invention.

Catalytic conversion was carried out according to the method in Example 17, except that Catalyst C1 were replaced by catalysts C4-C8 respectively and that the feed oil used was atmospheric residuum shown in Table 3. The reaction conditions and results are shown in Table 5.

Examples 20'-24'

The following examples show the performance of the catalyst provided by the present invention.

Catalytic conversion was carried out according to the method in Example 17, except that Catalyst C1 were replaced by catalysts C4'-C8' respectively and that the feed oil used was atmospheric residuum shown in Table 3. The reaction conditions and results are shown in Table 5.

TABLE 5

| Catalyst | Example 20 C4 | Example 21 C5 | Example 22 C6 | Example 23 C7 | Example 24 C8 | Example 20' C4' | Example 21' C5' | Example 22' C6' | Example 23' C7' | Example 24' C8' |
|---|---|---|---|---|---|---|---|---|---|---|
| Reaction Temperature, ° C. | 550 | 580 | 620 | 620 | 680 | 550 | 580 | 620 | 620 | 680 |
| Catalyst/oil weight ratio | 10 | 10 | 10 | 15 | 25 | 10 | 10 | 10 | 15 | 25 |
| Weight hourly space velocity, $h^{-1}$ | 10 | 10 | 15 | 15 | 20 | 10 | 10 | 15 | 15 | 20 |
| Steam/oil weight ratio | 25 | 25 | 50 | 80 | 80 | 25 | 25 | 50 | 80 | 80 |
| Conversion, wt. % | 79.8 | 83.4 | 86.4 | 88.5 | 92.4 | 79.9 | 83.6 | 86.6 | 88.6 | 92.5 |
| Product distribution, wt. % | | | | | | | | | | |
| Cracking gas | 50.1 | 53.5 | 54.9 | 57.6 | 61.5 | 50.1 | 53.4 | 55.1 | 57.6 | 61.7 |
| Gasoline ($C_5$-221° C.) | 21.6 | 20.2 | 19.4 | 18.3 | 16.4 | 21.5 | 20.4 | 19.3 | 18.2 | 16.1 |
| LCO (221-330° C.) | 12.6 | 10.5 | 9.0 | 7.5 | 5.9 | 12.6 | 10.3 | 8.9 | 7.6 | 6.0 |
| Heavy oil (>330° C.) | 7.6 | 6.1 | 4.6 | 4.0 | 1.7 | 7.5 | 6.1 | 4.5 | 3.8 | 1.5 |
| Coke | 8.1 | 9.7 | 12.1 | 12.6 | 14.5 | 8.3 | 9.8 | 12.2 | 12.8 | 14.7 |
| Wherein propylene | 21.3 | 23.2 | 24.1 | 25.3 | 22.8 | 21.5 | 23.4 | 24.2 | 25.6 | 22.9 |
| Wherein ethylene | 7.6 | 10.1 | 12.3 | 12.9 | 21.5 | 7.7 | 10.2 | 12.4 | 12.8 | 21.8 |
| Wherein BTX* | 6.2 | 6.8 | 6.9 | 7.1 | 6.8 | 6.0 | 6.6 | 6.7 | 7.0 | 6.7 |

*BTX denotes benzene, toluene, and xylene.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A zeolite-containing catalyst for converting hydrocarbons, said catalyst comprising:
a zeolite, a thermotolerant inorganic oxide, and optionally a clay, characterized in that said zeolite is a MFI-structured zeolite containing phosphor and at least one transition metal or a mixture of said MFI-structured zeolite containing phosphor and said at least one transition metal with a macroporous zeolite, which comprises, based on the weight of the mixture, 75-100% by weight of said MFI-structured zeolite containing phosphor and said at least one transition metal and 0-25% by weight of the macroporous zeolite; wherein in the terms of the mass of the oxide, said MFI-structured zeolite containing phosphor and said at least one transition metal has an anhydrous chemical formula selected from:

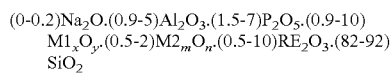

or

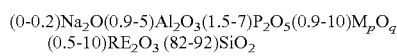

wherein M1 is a transition metal selected from Fe, Co, and Ni, M2 is a transition metal selected from Zn, Mn, Ga, and Sn, M is a transition metal selected from Fe, Co, Ni, Cu, Zn, Mo or Mn, and RE represents a rare earth metal; x is 1 or 2, when x is 1, the value of y is a half of the valence of the transition metal M1, and when x is 2, the value of y is the valence of the transition metal M1; m is 1 or 2, when m is 1, the value of n is a half of the valence of the transition metal M2, and when m is 2, the value of n is the valence of the transition metal M2; p is 1 or 2, when p is 1, the value of q is a half of the valence of the transition metal M, and when p is 2, the value of q is the valence of the transition metal M; the catalyst also contains an assistant catalytic component, which is one or more selected from the group consisting of Group IVB metals, non-noble metals in Group VIII, and rare earth metals of the Periodic Table of the Elements; based on the weight of the catalyst, said catalyst contains 1-60% by weight of a zeolite, 0.1-10% by weight of an assistant catalytic component, 5-98% by weight of a thermotolerant inorganic oxide, and 0-70% by weight of a clay in terms of the oxide.

2. The catalyst according to claim 1, characterized in that based on the weight of the catalyst, said catalyst contains 10-50% by weight of a zeolite, 0.5-8% by weight of an assistant catalytic component, 10-70% by weight of a thermotolerant inorganic oxide, and 0-60% by weight of a clay.

3. The catalyst according to claim 1, characterized in that M1 is Fe.

4. The catalyst according to claim 1, characterized in that M2 is Zn.

5. The catalyst according to claim 1, characterized in that M1 is Fe and M2 is Zn.

6. The catalyst according to claim 1, characterized in that M is selected from Fe, Co or Ni.

7. The catalyst according to claim 1, characterized in that said assistant catalytic component is one or more selected from the group consisting of zirconium, titanium, lanthanum, cerium, iron, cobalt, and nickel.

8. The catalyst according to claim 1, characterized in that said thermotolerant inorganic oxide is one or more selected from the group consisting of alumina, silica, and amorphous silica-alumina.

9. The catalyst according to claim 1, characterized in that said clay is one or more selected from the group consisting of kaolin, halloysite, montmorillonite, kieselguhr, endellite, saponite, rectorite, sepiolite, attapulgite, hydrotalcite, and bentonite.

10. A process for preparing the catalyst of claim 1, said process comprising mixing and slurrying a thermotolerant inorganic oxide or its precursor, water, and optionally a clay, adding a zeolite, and drying the obtained slurry, characterized in that an assistant compound is also added before adding the zeolite and before or after adding the clay, adding an acid to bring the pH value of the slurry to 1-5, aging at 30-90° C. for 0.1-10 h, and adding the remaining thermotolerant inorganic oxide or its precursor after aging; said zeolite is a MFI-structured zeolite containing phosphor and at least one transition metal or a mixture of said MFI-structured zeolite containing phosphor and at least one transition metal with a macroporous zeolite, which comprises, based on the weight of the mixture, 75-100% by weight of said MFI-structured zeolite containing phosphor and at least one transition metal and 0-25% by weight of the macroporous zeolite; wherein in terms of the mass of the oxide, said MFI-structured zeolite containing phosphor and at least one transition metal has an anhydrous chemical formula selected from:

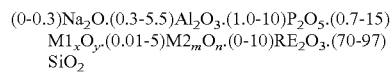

and

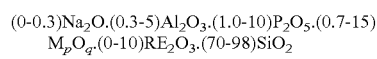

wherein M1 is a transition metal selected from Fe, Co, and Ni, M2 is a transition metal selected from Zn, Mn, Ga, and Sn, M is a transition metal selected from Fe, Co, Ni, Cu, Zn, Mo or Mn, and RE represents a rare earth metal; x is 1 or 2, when x is 1, the value of y is a half of the valence of the transition metal M1, and when x is 2, the value of y is the valence of the transition metal M1; m is 1 or 2, when m is 1, the value of n is a half of the valence of the transition metal M2, and when m is 2, the value of n is the valence of the transition metal M2; p is 1 or 2, when p is 1, the value of q is a half of the valence of the transition metal M, and when p is 2, the value of q is the valence of the transition metal M; the amounts of components make the final catalyst contain, based on the weight of the catalyst, 1-60% by weight of the zeolite, 0.1-10% by weight of the assistant catalytic component, 5-98% by weight of the thermotolerant inorganic oxide, and 0-70% by weight of the clay in terms of the oxide.

11. The process according to claim 10, characterized in that before aging, a part of the thermotolerant inorganic oxide or its precursor is added first, and after aging, the remaining thermotolerant inorganic oxide or its precursor is added; the first added part and the subsequently added part allow the weight ratio of the first added thermotolerant inorganic oxide to the subsequently added thermotolerant inorganic oxide to be 1:0.1-10 in catalyst.

12. The process according to claim 11, characterized in that said weight ratio is 1: 0.1-5.

13. The process according to claim 10, characterized in that said acid is one or more selected from the group consisting of hydrochloric acid, nitric acid, phosphoric acid, and carboxylic acids with 1-10 carbon atoms, and the amount of the acid allows the pH value of the slurry to be 1.5-4.

14. The process according to claim 10, characterized in that the temperature for said aging is 40-80° C. and the duration for said aging is 0.5-8 h.

15. The process according to claim 10, characterized in that said assistant compound is one or more selected from the group consisting of halides, nitrates, sulfates, and phosphates of zirconium, titanium, lanthanum, cerium, iron, cobalt, and nickel.

16. A zeolite-containing catalyst for converting hydrocarbons, said catalyst comprising:
a zeolite, a thermotolerant inorganic oxide, and optionally a clay, characterized in that said zeolite is a MFI-structured zeolite containing phosphor and at least one transition metal or a mixture of said MFI-structured zeolite containing phosphor and said at least one transition metal with a macroporous zeolite, which comprises, based on the weight of the mixture, 75-100% by weight of said MFI-structured zeolite containing phosphor and said at least one transition metal and 0-25% by weight of the macroporous zeolite, and said macroporous zeolite is one or more selected from the group consisting of faujasite, zeolite-L, zeolite-β, zeolite-Ω, mordenite, and ZSM-18 zeolite; wherein in the terms of the mass of the oxide, said MFI-structured zeolite containing phosphor and said at least one transition metal has an anhydrous chemical formula selected from:

$$(0\text{-}0.3)Na_2O \cdot (0.3\text{-}5.5)Al_2O_3 \cdot (1.0\text{-}10)P_2O_5 \cdot (0.7\text{-}15)M1_xO_y \cdot (0.01\text{-}5)M2_mO_n \cdot (0\text{-}10)RE_2O_3 \cdot (70\text{-}97)SiO_2 \qquad \text{I}$$

and $$(0\text{-}0.3)Na_2O \cdot (0.3\text{-}5)Al_2O_3 \cdot (1.0\text{-}10)P_2O_5 \cdot (0.7\text{-}15)M_pO_q \cdot (0\text{-}10)RE_2O_3 \cdot (70\text{-}98)SiO_2 \qquad \text{II}$$

wherein M1 is a transition metal selected from Fe, Co, and Ni, M2 is a transition metal selected from Zn, Mn, Ga, and Sn, M is a transition metal selected from Fe, Co, Ni, Cu, Zn, Mo or Mn, and RE represents a rare earth metal; x is 1 or 2, when x is 1, the value of y is a half of the valence of the transition metal M1, and when x is 2, the value of y is the valence of the transition metal M1; m is 1 or 2, when m is 1, the value of n is a half of the valence of the transition metal M2, and when m is 2, the value of n is the valence of the transition metal M2; p is 1 or 2, when p is 1, the value of q is a half of the valence of the transition metal M, and when p is 2, the value of q is the valence of the transition metal M; the catalyst also contains an assistant catalytic component, which is one or more selected from the group consisting of Group IVB metals, non-noble metals in Group VIII, and rare earth metals of the Periodic Table of the Elements; based on the weight of the catalyst, said catalyst contains 1-60% by weight of a zeolite, 0.1-10% by weight of an assistant catalytic component, 5-98% by weight of a thermotolerant inorganic oxide, and 0-70% by weight of a clay in terms of the oxide.

17. The catalyst according to claim 16, characterized in that said macroporous zeolite is one or more selected from the group consisting of Zeolite-Y, Zeolite-Y containing phosphor and optionally rare earth metal, ultrastable Zeolite-Y, ultrastable Zeolite-Y containing phosphor and/or rare earth, and zeolite-β.

* * * * *